Jan. 21, 1969     L. TRACHTENBERG ET AL     3,423,571
INSULATED ELECTRICALLY HEATED BOTTLE
Filed Oct. 19, 1965     Sheet 1 of 4
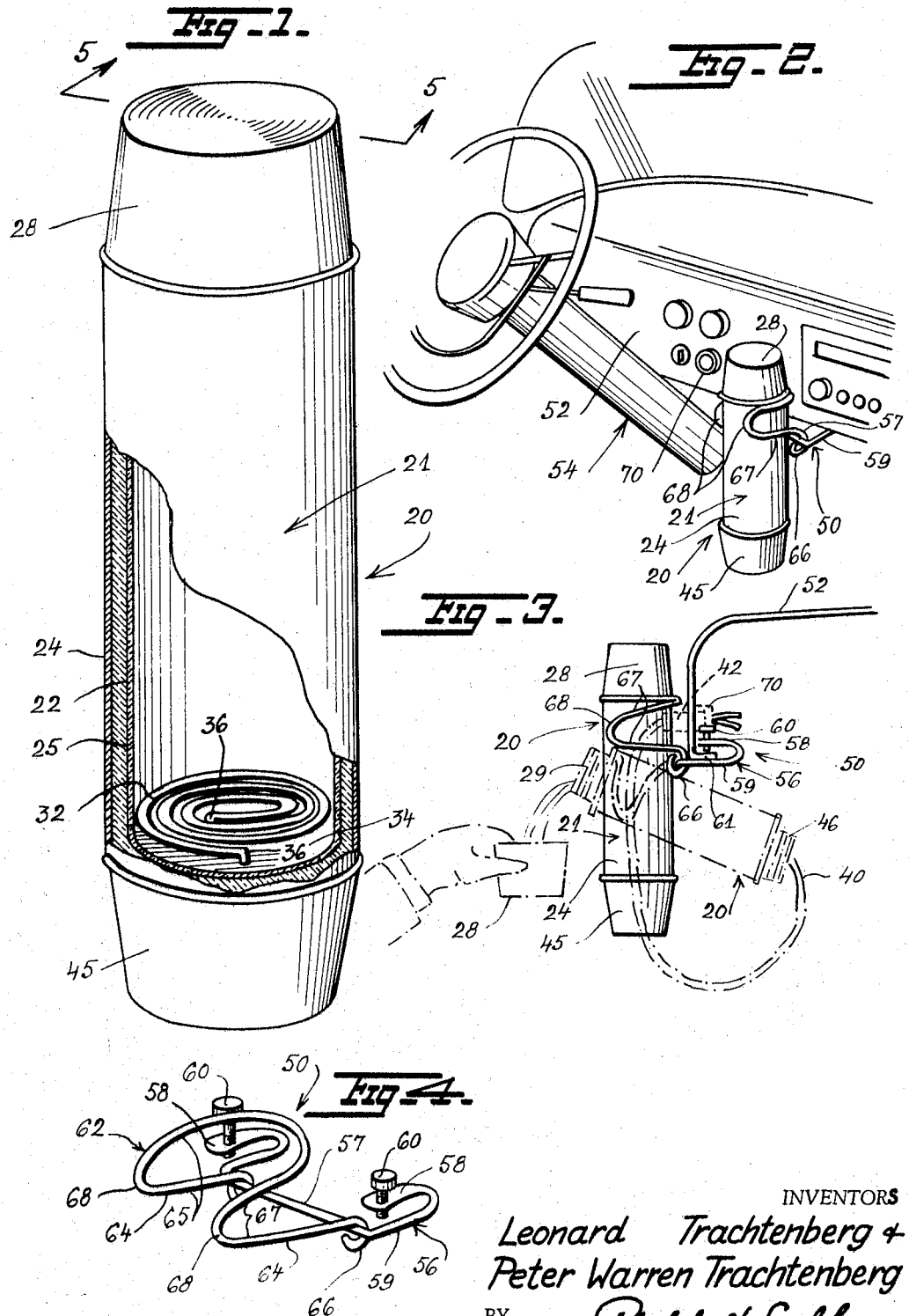
INVENTORS
Leonard Trachtenberg &
Peter Warren Trachtenberg
BY Polachek & Saulsbury
ATTORNEYS Jan. 21, 1969  L. TRACHTENBERG ET AL  3,423,571
INSULATED ELECTRICALLY HEATED BOTTLE
Filed Oct. 19, 1965  Sheet 2 of 4
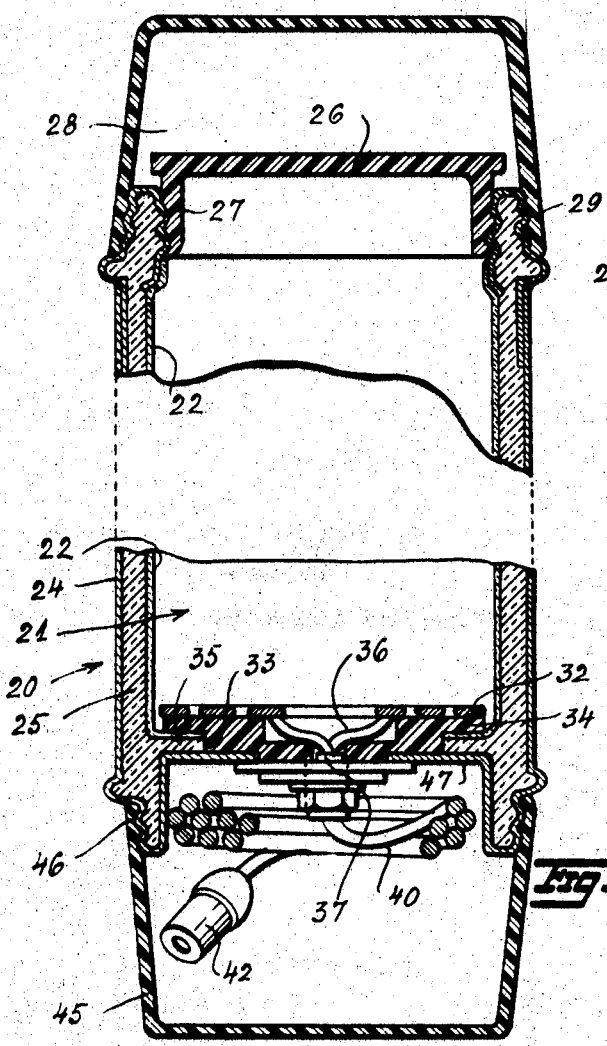
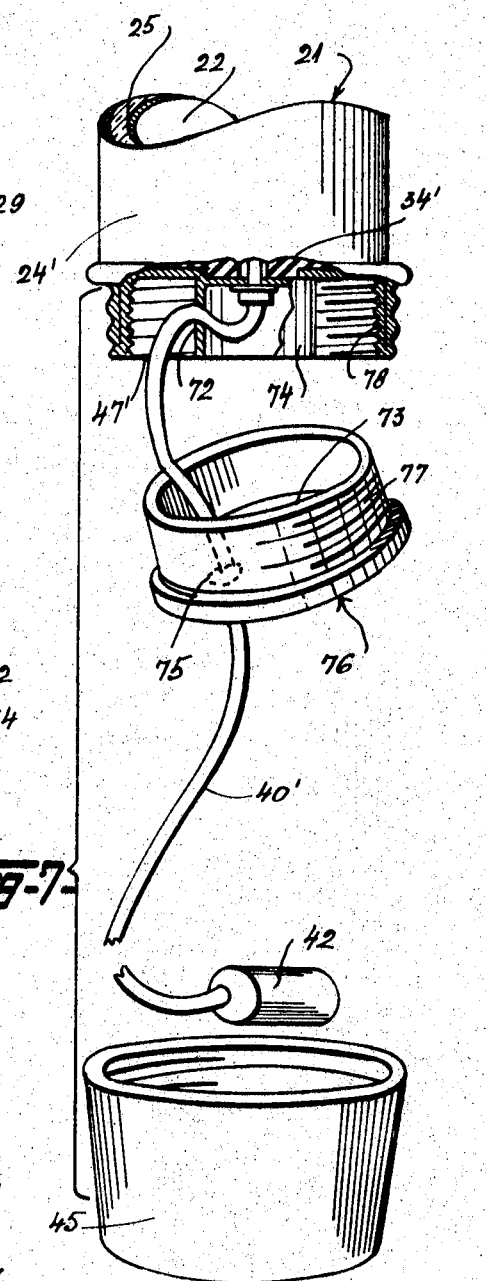
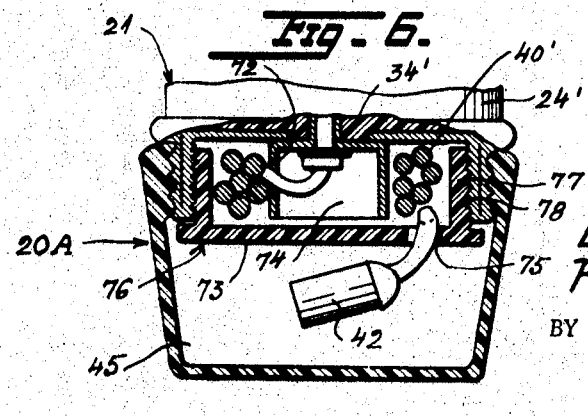
INVENTORS
Leonard Trachtenberg
Peter Warren Trachtenberg
BY
Polachek & Saulsbury
ATTORNEYS

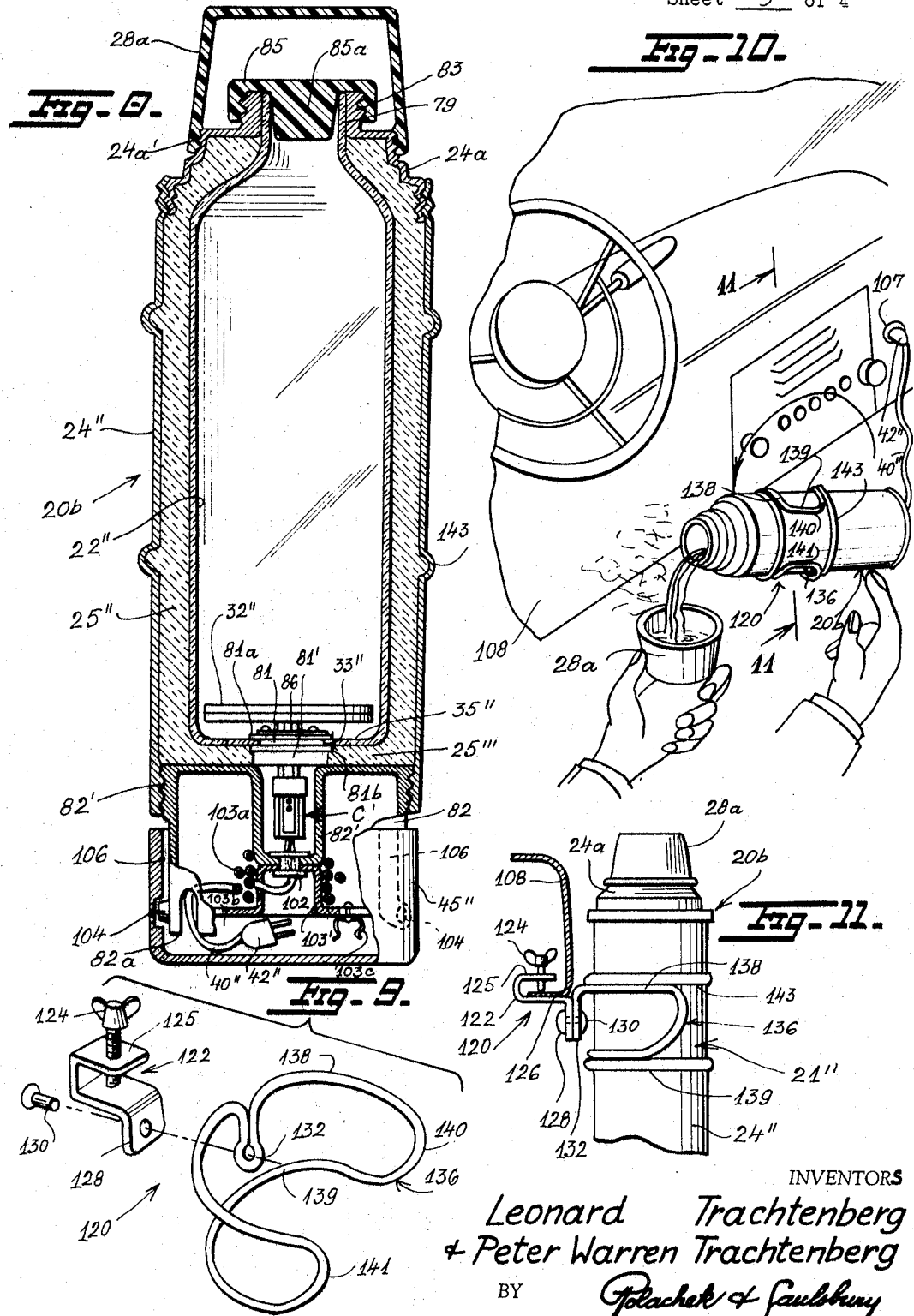

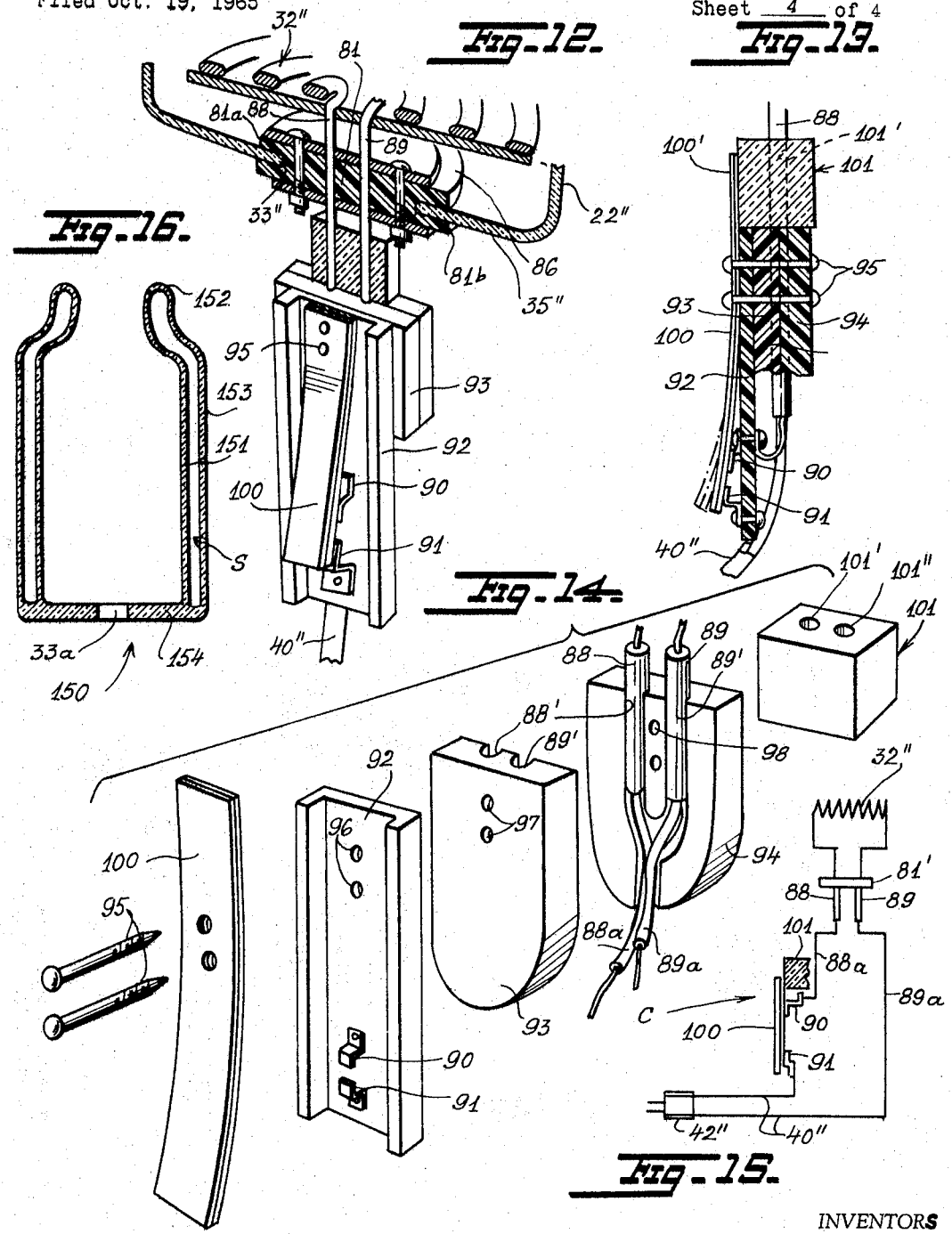

United States Patent Office 3,423,571
Patented Jan. 21, 1969

3,423,571
INSULATED ELECTRICALLY HEATED BOTTLE
Leonard Trachtenberg and Peter Warren Trachtenberg, both of 512 Pleasant Valley Way, West Orange, N.J. 07052
Filed Oct. 19, 1965, Ser. No. 497,841
U.S. Cl. 219—441  3 Claims
Int. Cl. F27d 11/02

ABSTRACT OF THE DISCLOSURE

An electrically heated bottle having a cylindrical hollow body with outer and inner metal walls and insulation therebetween. An electrical resistance heater element and a self-contained power cord are mounted in the body, with the cord connected to the heater element so that the bottle can be heated by connection of the cord to a convenient outlet. The bottle has means for reeling the power cord into the bottle and means for connecting the power cord to the cigarette lighter on the dashboard of a vehicle. Spring clamping means are provided for pivotally and detachably mounting the bottle on the dashboard of the vehicle. The heating of the bottle is controlled by a thermostat.

SUMMARY OF THE INVENTION

An electrically heated bottle with a body open at both ends, and having formed closure means at both ends of the body. An insulated plug is fittted in one end of the body and supports an electrical resistance heater element, for heating the contents of the bottle. The body has a cylindrical extension at one end, inside of which there is a reel of cord. A thermostatic switch element is disposed in the extension connected in circuit with the heater element. Clamping means supports bottle in vertical position of, but permits tilting thereof for discharge of the contents thereof.

One object of the invention is to provide an insulated bottle having an electrical resistance heater element and a self contained power cord connected to the heater element so that the bottle can be heated by quick detachable connection of the power cord to a convenience outlet.

Another object is to provide an insulated bottle as described with means for reeling the power cord into the bottle.

A further object is to provide an insulated bottle as described with means for connecting the power cord to the cigarette lighter outlet on the dashboard of a vehicle and with spring clamp means for pivotally and detachably mounting the bottle on the dashboard of the vehicle.

A still further object is to provide a thermostatically controlled insulated electrically heated bottle.

It is still a further object to provide an efficient and effective container for hot and cold substances such as various foods and liquids which need to be temporarily kept in a cool state prior to being heated for use and wherein the heating can be done quickly at the time when the food is to be consumed.

For further comprehension of the invention and of the objects and advantages thereof, reference will be had to the following description and accompanying drawings and to the appended claims in which the various novel features of the invention are more particularly set forth.

In the accompanying drawings forming a material part of this disclosure:

FIGURE 1 is a side view of an insulated bottle embodying the invention, parts being broken away to show internal construction.

FIG. 2 is a perspective view on a reduced scale, showing the bottle supported by a spring clamp mounting on the dashboard of a vehicle.

FIG. 3 is a side view of the bottle shown in FIG. 2 illustrating the pivotal mounting thereof.

FIG. 4 is a perspective view on an enlarged scale of the spring clamp mounting shown in FIGS. 2 and 3.

FIG. 5 is an enlarged sectional view taken on line 5—5 of FIG. 1, with parts broken away.

FIG. 6 is a fragmentary sectional view of another bottle, similar to a part of FIG. 5, illustrating another form of the invention.

FIG. 7 is an exploded perspective view of parts of the bottle of FIG. 6.

FIG. 8 is a longitudinal central sectional view of another bottle embodying the invention.

FIG. 9 is an exploded perspective view of another spring clamp mounting for an insulated bottle.

FIG. 10 is a reduced perspective view of the bottle of FIG. 8 shown pivotally mounted by the spring clamp mounting of FIG. 9 on the dashboard of a vehicle.

FIG. 11 is a fragmentary side view of the bottle of FIGS. 8 and 10, shown held in an upright position by the spring clamp mounting of FIG. 9, with part of the dashboard shown in cross section.

FIG. 12 is a perspective view partially in section on an enlarged scale showing the construction of an electrical assembly used in the bottle of FIG. 8.

FIG. 13 is a sectional view showing parts of a thermostat employed in electrical assembly of FIG. 12.

FIG. 14 is an exploded perspective view of parts of the electrical assembly of FIG. 12.

FIG. 15 is a diagram of the circuit employed in the electrical assembly of FIG. 12.

FIG. 16 is a reduced sectional view of an insulated bottle filler which may be employed in the bottle of FIG. 8.

Referring first to FIGS. 1–5, there is shown insulated bottle 20 including a cylindrical body 21 defined by concentric inner and outer thin walls 22, 24 with a thermal insulation filler 25 therebetween. The upper end of the bottle body 21 is closed by an inner threaded cap 26 screwed into the mouth of body 21 and engaged by internal threads 27 formed at the top of inner wall 22. A cup 28 is removably screwed on the threaded upper end 29 of outer wall 24. To the extent described, the bottle is substantially conventional.

Now according to the invention, there is provided a coiled electrical resistance heater element 32 disposed on a thermal and electrically insulated plug 34 fitted into an opening 33 at the bottom 35 of the bottle body. The ends of the coiled element 32 terminate in wires 36 which extend through a fitting 37 secured to the underside of plug 34. The wires 36 are formed into an electric cable or cord 40 which terminates in a plug 42. The electric cord 40 is retained within another cup 45 internally threaded at its free end and detachably engaged on the bottom end of body 21. Outer wall 24 is formed with external threading 46 to engage the cup 45. Wall 24 extends inwardly and upwardly from threading 46 to define a cup shaped flange 47 underlaying plug 34.

A spring clamp mounting 50 is provided for supporting bottle 20 in an upright position, but pivotable therefrom, on the dashboard 52 of a vehicle 54. This mounting has a generally U-shaped wire member 56 formed with flattened portions 58 at ends of its bent arms 59. The flattened portions 58 support screws 60. These screws can engage on inner inwardly extending bottom flange 61 of the dashboard 52 as clearly shown in FIG. 3 to provide a stationary support. A spring clamp 62 forms part of mounting 50. This clamp is formed from a bent piece of wire. The wire is bent U-shaped to define two curved arms 64 which have end loops or eyes 66 pivotally engaged on straight bight 57 of member 56. Two opposed intermediate loops 68 are formed in clamp 62 to define double curved arms 65 and 67 yieldably embracing the body 21 of the bottle 20 as clearly shown in FIGS. 2 and 3. The bottle 20 can be tilted from an axially upright or vertical position to an inclined position as shown in dotted lines for emptying liquid contents of the bottle into cup 28 or 45. The plug 42 at the end of cable 40 can be inserted into the usual cigarette lighter receptacle 70 on the dashboard of the vehicle for energizing heater element 32. The energized heater element will heat the contents of the bottle.

In FIGS. 6 and 7 is shown another insulated bottle 20A which is generally similar to bottle 20 and corresponding parts are identically numbered. In bottle 20A, the power supply cord 40' extends laterally through a hole 72 formed in a thimble 74 secured to the underside of plug 34'. The cord extends further through a hole 75 formed in the bottom circular end 73 of a cup shaped reel 76. This reel has a cylindrical wall 77 externally threaded and engaged on internal threading 78 formed at the bottom cylindrical extension 47' of external wall 24'. The cord 40' is coiled around the thimble 74 and extends out of the reel through hole 75. The cord terminates in plug 42. When cup 45 is removed, the cord 40' can be played out by turning the reel 76 on body extension 47' inside threading 78. The cord can be rewound by turning the reel in opposite direction.

In FIGS. 8, 10 and 11 is shown another bottle 20b embodying the invention. This bottle has an outer thin metal shell wall 24" and an inner cylindrical glass liner 22". Thermal insulation 25" is disposed between the concentric shell wall 24" and liner 22". In addition to the insulation underlays, the liner has the circular bottom wall 35". A central hole 33" is formed in the liner bottom wall. In this hole there is a plug 81 having an upper annular flange 81a bearing on the upper side of bottom wall 35" of the liner; see FIGS. 8 and 12. A lower annular flange 81b bears on the underside of the liner bottom wall 35". An extension 82 of the bottle is a cup-shaped member which is inverted so that it is open at the bottom. The inverted cup-shaped member is externally threaded and engages internal threading 82' formed at the lower end of outer wall 24". An insulated plug 81' is provided in bottom insulation 25'''. At the upper end of liner 22" is a neck 79 surrounded in sealing relationship by the externally-threaded upper end 83 of a generally conical metal shell 24a. This shell 24a is engaged in threaded relationship with the upper threaded end of outer wall 24". A screw cap 85 is engaged on the threaded end 83 of shell 24a. This cap has a depending axial plug 85a which extends into and seals the open neck 79 of the liner 22". A cup 28a is threadedly fitted at 24a' on a shoulder of shell 24a.

The coiled resistance heater element 32" is mounted on plug 81a on bottom wall 35". Metal sleeved and insulated wires 88, 89 are connected to ends of the element 32". These wires extend downwardly through plug 81 and the wires 88 terminate at spaced electrical contacts 90, 91. These contacts 90, 91 are mounted on an insulated plate 92 secured to separable insulated blocks 93. Plate 92 is secured to block 93 and an abutting block 94 by rivets 95 extending through registering holes 96 in plate 92 and 97, 98 in separable blocks 93, 94. Blocks 93, 94 have opposing grooves 88', 89' defining passages through which extend insulated wires 88, 89, FIGS. 12, 13 and 14.

The rivets 95 also secure a bimetallic thermally-responsive element 100 to the plate 92 in such a position that it normally abuts the contacts 90, 91 on the plate 92. A glass block 101 with holes 101' and 101" to receive the wires 88 and 89 is interposed between the plug 81 and the top of the blocks 93 and 94, the wires conducting heat to the upwardly extending end 100' of the thermal element 100 that normally rests thereagainst. The grooves 88' and 89' are joined at the lower ends of the blocks 93, 94 and are unsleeved and constitute insulated wires 88a, 89a extending from the blocks, FIG. 14.

Circuit C in FIG. 15 shows the bimetallic element 100 bridging the contacts 90, 91 so that the power supply circuit for resistance heater element 32" is continuous with the wires of power supply cord 40" between the terminals of plug 42".

The entire block assembly indicated generally at C' of plate 92, blocks 93, 94 and bimetallic element 100 are contained within dropped sleeve portion 82' of the inverted cup-shaped body extension 82 as clearly shown in FIG. 8. The cord 40" passes through a sleeve pivot 102 that revolvably holds a turn plate or reel 103 and may be wound around the dropped portion 82' inside body extension 82. The body extension 82 has a pair of diametrically opposed pins 104 which engage L-shaped grooves or bayonet slots 106 formed in the inner side of cup 45" so that the cup is removably engaged on the bottle. The cup 45" is simply removed by twisting it slightly circumferentially and then pulling it axially from the body extension 82.

The extension 82 has a slot 82a through which the cord 40" may pass laterally. To wind the cord 40", the turn plate 103 which has a hub portion 103' with a hole 103a and a peripheral slot 103b is turned by grasping a clip 103c which is adapted to hold plug 42" when the cord 40" is retracted into bottle 20b.

To use the bottle, the plug 42" is plugged into a convenient outlet such as cigarette lighter receptacle 107 on dashboard 108 of vehicle shown in FIG. 10. If the unit is plugged into current, without any liquid present, or, if liquid present has evaporated below coil level, then the bimetallic element 100 serves as a thermostat switch member, breaking contact, so as to avoid damage to the unit. The thermal element 100 when heated will bend away from contacts 90, 91 as indicated by dotted lines in FIG. 13 to open the power supply circuit and cut off the electrical energy supplied to heater element 32". This thermal element may be sufficiently sensitive to maintain the contents at a desired temperature.

FIGS. 9, 10 and 11 show a convenient spring clamp mounting 120 for the bottle 20b. This mounting has a U-shaped bent metal clamp member 122 provided with a wing screw 124 located in the upper arm 125 of member 122. Member 122 can be engaged on flange 126 extending horizontally from dashboard 108. The member 122 has a depending apertured flange 128 which receives a rivet 130. This rivet pivotally engages a loop 132 formed in U-shaped spring clamp member 136. Member 136 is formed as an endless ring with arcuate arms 138, 139 joined by bends 140, 141. Loop 132 is formed in upper arm 138. The double arms engage the body 21" of bottle 20B between circumferential ribs 143, with spring tension and hold it axially upright as shown in FIG. 11. The pivotable mounting of member 136 permits the bottle to be turned on a horizontal axis as shown in FIG. 10 for emptying the contents of the bottle into cup 28a or 45". FIG. 16 shows a cylindrical glass member 150 which can be substituted for the glass liner 22" and insulation 25" inside outer wall 24". This member has concentric spaced inner and outer cylindrical walls 151, 153 integrally joined at the upper open neck end 152 of the liner and at the solid circular bottom wall 154 of the member 150. Hole 33a is formed in the bottom wall 154 to receive plug 34" and the other parts as described in connection with bottle 20b. A thermally insulating air or vacuum space S is defined between walls 151, 153.

While we have illustrated and described the preferred embodiments of our invention, it is to be understood that we do not limit ourselves to the precise constructions herein disclosed and that various changes and modifications may be made within the scope of the invention as defined in the appended claims.

What is claimed is:

1. An electrically heated botle, comprising
    (a) a cylindrical hollow body open at both ends, removable first closure means closing one end of said body,
(b) an insulated plug fitted in the other end of said body,
(c) an electrical resistance heater element affixed to one side of said plug inside the body for heating the contents thereof,
(d) a flexible electric cord electrically connected at one end thereof through said plug to said heater element, said body having a cylindrical extension extending axially of said body beyond said plug, whereby a major portion of said cord can be coiled inside said cylindrical extension, said cylindrical extension having a free open end,
(e) an electrical connector on the other end of said cord,
(f) removable second closure means on the free end of the cylindrical extension a normally closed thermostat switch disposed in said cylindrical extension and connected in circuit with said electric cord and heater element for opening said circuit when said element reaches a predetermined temperature, said thermostat being provided with means in heat exchange with said heater element, said cylindrical body comprising a thin metal cylindrical outer wall and a thin glass cylindrical inner wall, said walls being concentric with each other and spaced apart, and thermal insulating means between said walls.

2. An electrically heated bottle as recited in claim 1, comprising spring clamp means for engaging said body to support the bottle in an axially vertical position, said clamp means including mutually pivotable parts, whereby one of said parts can be attached to a stationary support while the other part engages said bottle to permit the bottle to be tilted angularly from said axially vertical position while remaining engaged by said clamp means.

3. An electrically heated bottle, comprising
(a) a cylindrical hollow body open at both ends, removable first closure means closing one end of said body,
(b) an insulated plug fitted in the other end of said body,
(c) an electrical resistance heater element affixed to one side of said plug inside said body for heating the contents thereof,
(d) a flexible electric cord electrically connected at one end thereof through said plug to said heater element, said body having a cylindrical extension extending axially of said body beyond said plug, whereby a major portion of said cord can be coiled inside cylindrical extension, said cylindrical extension having a free open end,
(e) an electrical connector on the other end of said cord, removable second closure means on the free end of the cylindrical extension, a dropped sleeve portion in said cylindrical extension, a normally closed thermostat switch disposed in the dropped sleeve portion of said cylindrical extension and connected in circuit with said electric cord and heater element for opening said circuit when said element reaches a predetermined temperature, said thermostat being provided with means in heat exchange with said heater element, said cylindrical body comprising a thin cylindrical outer wall and a thin glass cylindrical inner wall, said walls being concentric with each other and spaced apart, and thermal insulating means between said walls, said bottle including spring clamp means for engaging said body to support the bottle in an axially vertical position, said clamp means including mutually pivotable parts, whereby one of said parts can be attached to a stationary support while the other part engages said bottle to permit the bottle to be tilted angularly from said axially vertical position while remaining engaged by said clamp means, both the first and second closure means being cup shaped to define containers for receiving contents of said body and a reel for said cord mounted on the dropped sleeve portion and located within the cylindrical extension.

References Cited

UNITED STATES PATENTS

| | | | |
|---|---|---|---|
| 2,277,605 | 3/1942 | Palitzsch | 219—436 X |
| 2,632,618 | 3/1953 | Griglak | 248—311 |
| 3,021,087 | 2/1962 | Rudolph | 242—85.1 |
| 3,247,360 | 4/1966 | Ponder. | |

FOREIGN PATENTS

| | | |
|---|---|---|
| 338,680 | 6/1921 | Germany. |
| 447,699 | 7/1927 | Germany. |
| 719,962 | 12/1954 | Great Britain. |
| 803,450 | 10/1958 | Great Britain. |
| 816,905 | 7/1959 | Great Britain. |

ANTHONY BARTIS, *Primary Examiner.*

U.S. Cl. X.R.

174—135; 191—12.4; 219—202, 437, 541; 242—85; 248—311